(12) United States Patent
Yao (10) Patent No.: US 11,988,269 B2
(45) Date of Patent: May 21, 2024

(54) THREE-STAGE SPEED-CHANGE MECHANISM

(71) Applicant: Li-Ho Yao, Taipei (TW)

(72) Inventor: Li-Ho Yao, Taipei (TW)

( * ) Notice: Subject to any disclaimer, the term of this patent is extended or adjusted under 35 U.S.C. 154(b) by 0 days.

(21) Appl. No.: 18/094,395

(22) Filed: Jan. 9, 2023

(65) Prior Publication Data

US 2023/0220906 A1 Jul. 13, 2023

(30) Foreign Application Priority Data

Jan. 11, 2022 (TW) .................................. 111101115

(51) Int. Cl.
*F16H 3/10* (2006.01)

(52) U.S. Cl.
CPC ....... *F16H 3/10* (2013.01); *F16H 2200/0039* (2013.01)

(58) Field of Classification Search
CPC ........................... F16H 3/10; F16H 2200/0039
USPC ....................................................... 74/606 R
See application file for complete search history.

(56) References Cited

U.S. PATENT DOCUMENTS

| 2014/0033844 A1* | 2/2014 | Rothvoss ................ F16H 3/089 74/335 |
| 2017/0152001 A1* | 6/2017 | Yamamoto ................ F16H 3/10 |
| 2018/0328455 A1* | 11/2018 | Yoneda ..................... F16H 3/10 |

FOREIGN PATENT DOCUMENTS

| CH | 144380 | * 12/1930 |
| CN | 102403836 | * 4/2012 |
| CN | 105299153 | * 2/2016 |
| CN | 108730430 | * 11/2018 |
| DE | 10 2015 116 537 | * 3/2017 |
| KR | 10 2015 0116635 | * 10/2015 |

\* cited by examiner

*Primary Examiner* — William C Joyce
(74) *Attorney, Agent, or Firm* — Leong C. Lei (57) ABSTRACT

A three-stage speed-change mechanism includes a casing in an interior of which a drive assembly, an input assembly, and an output assembly are arranged. The input assembly includes a transmission shaft driven by the drive wheel. An initial transmission wheel is mounted no a middle section of the transmission shaft. A first speed-change assembly and a second speed-change assembly are respectively arranged on two sides of the initial transmission wheel. The output assembly includes an output shaft, which is provided with an initial driven wheel and first and second speed-change wheels respectively mating the initial transmission wheel and the first and second speed-change assemblies. The initial driven wheel and the first speed-change wheel are respectively mounted by a first one-way bearing and a second one-way bearing on the output shaft. As such, a three-stage speed-change function is realized.

3 Claims, 10 Drawing Sheets

THREE-STAGE SPEED-CHANGE MECHANISM

TECHNICAL FIELD OF THE INVENTION

The present invention relates generally to the technical field of speed change.

DESCRIPTION OF THE PRIOR ART

An electric motorcycle makes use of an increase of decrease of a speed of an electric motor to change a speed thereof. Due to being limited by the size and insufficiency of available space, it is generally not possible to install a large-sized speed-change mechanism that is of a sophisticated structure. Generally speaking, for traveling at a low speed, the rotational speed of the motor is kept at 1,000-2,000 rpm to provide a better performance, yet when the electrical motorcycle needs to travel at a high speed, the rotational speed of the motor is raised to higher than 2,000 rpm. This would deteriorate the performance of the motor. Thus, the best way for handling such a problem is to provide a speed-change mechanism to keep the motor at 1,000-2,000 rpm, while an output shaft drives an output wheel to reach a rotational speed of higher than 2,000 rpm.

The speed-change mechanisms that are currently available are classified in two types, one being gear-based speed changer, which has a better efficiency for speed switching, but has a complicated structure so that the cost is high and servicing is difficult, and there are sometimes situations of setting back in increasing or decreasing speed during an operation of speed change. The second one is continuously variable transmission (CVT), which, although being simplified in structure to thereby reduce the cost and be easy to service, has a poor efficiency of speed switching.

In brief, all the currently available speed change mechanisms suffer certain problems in respect of the structure being complicated, and thus increased difficulty of servicing or replacement, and poor efficiency of speed switching. Thus, the present invention aims to provide a solution to such problems.

SUMMARY OF THE INVENTION

The primary objective of the present invention is to provide an effective and simplified structure, of which a structural arrangement is used to effectively reduce the difficulty of assembling and servicing so as to ease maintenance and replacement and achieve an effect of time saving and labor saving.

Another objective of the present invention is to provide three-stage speed change, and direct transfer of power being available during speed change, so as to achieve a purpose of increasing the speed and reliability of speed change.

A further objective of the present invention is to eliminate setting back in a process of speed change to achieve a purpose of stable and comfortable speed change.

DETAILED DESCRIPTION OF THE PREFERRED EMBODIMENT

Figure 1:
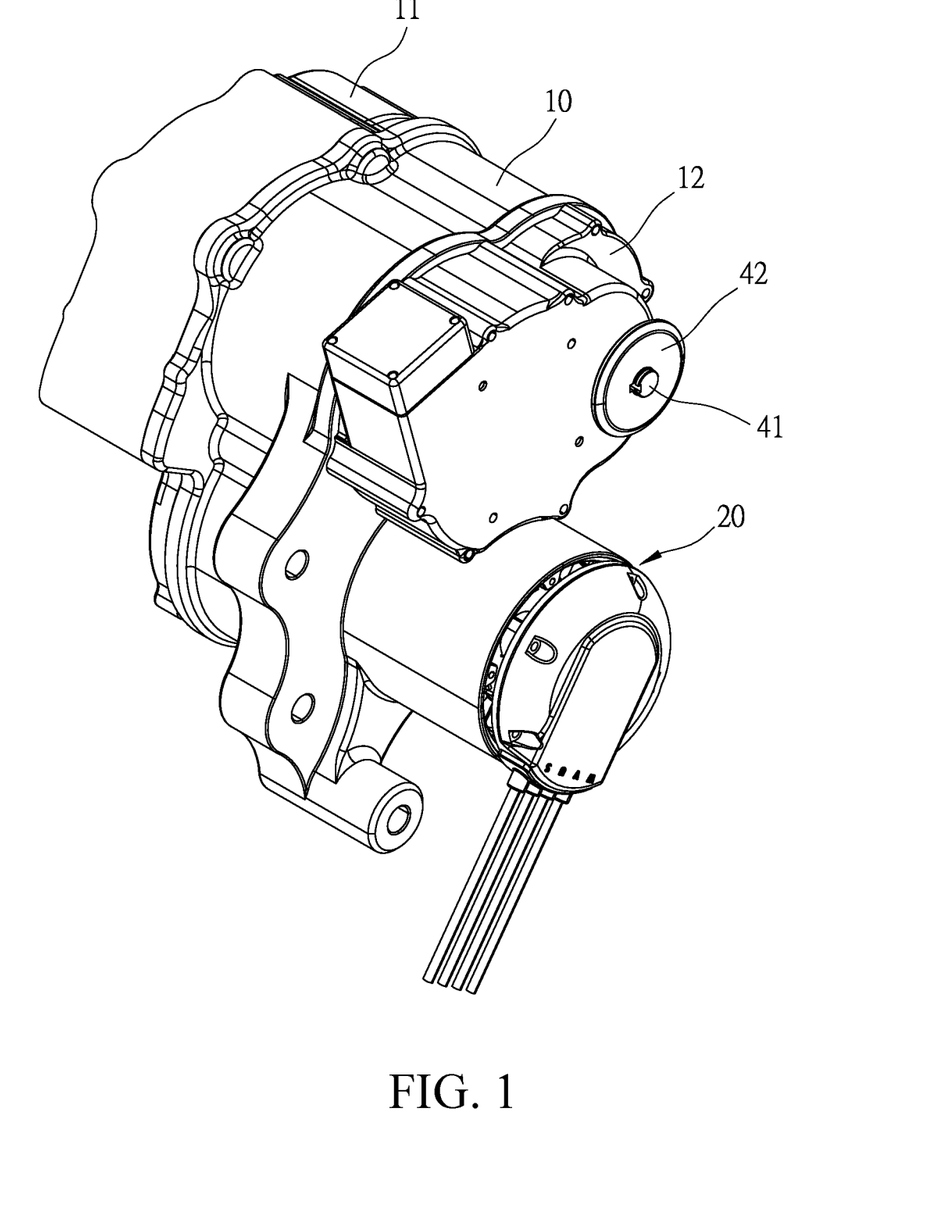
FIG. 1 is a perspective view of the present invention.
Figure 2:
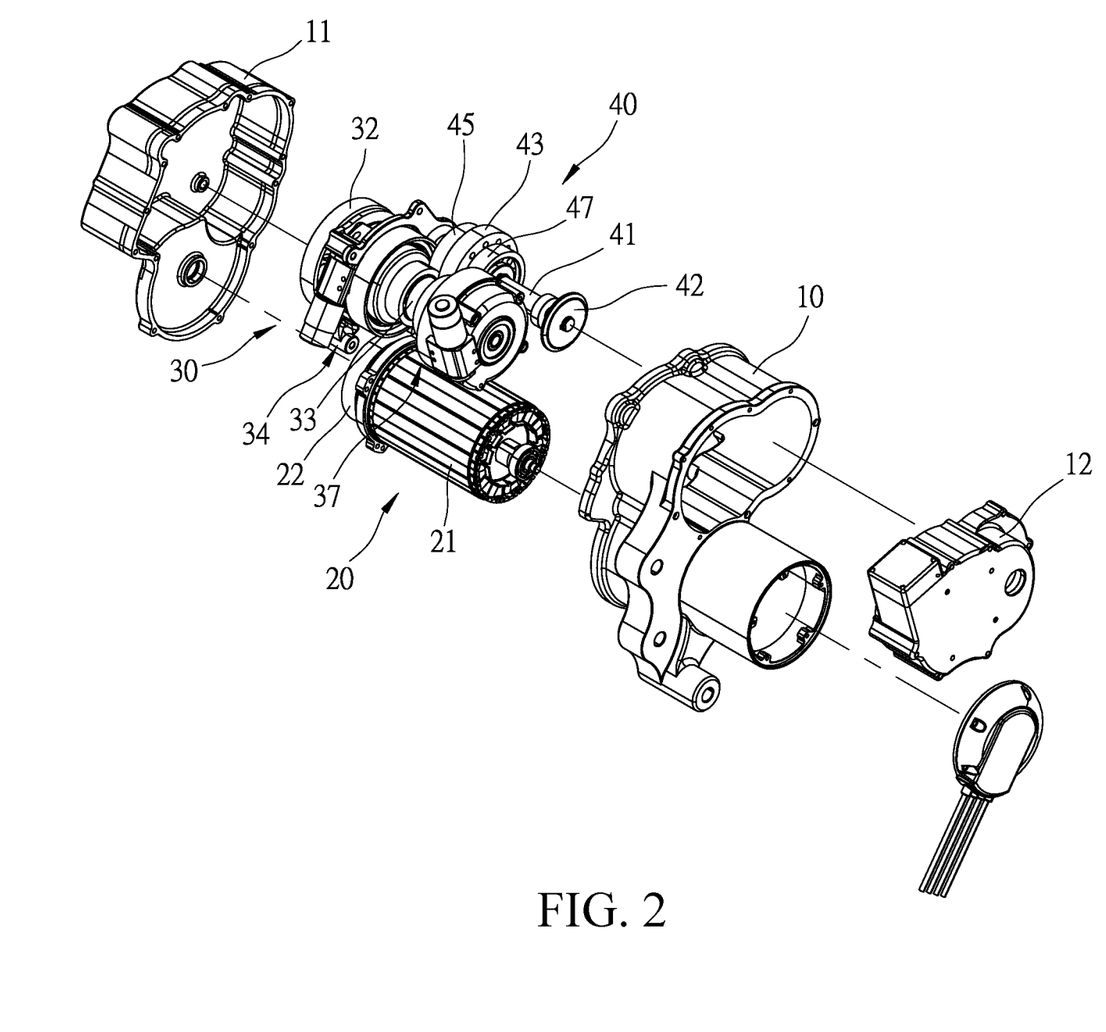
FIG. 2 is a rough exploded view of the present invention.
Figure 3:
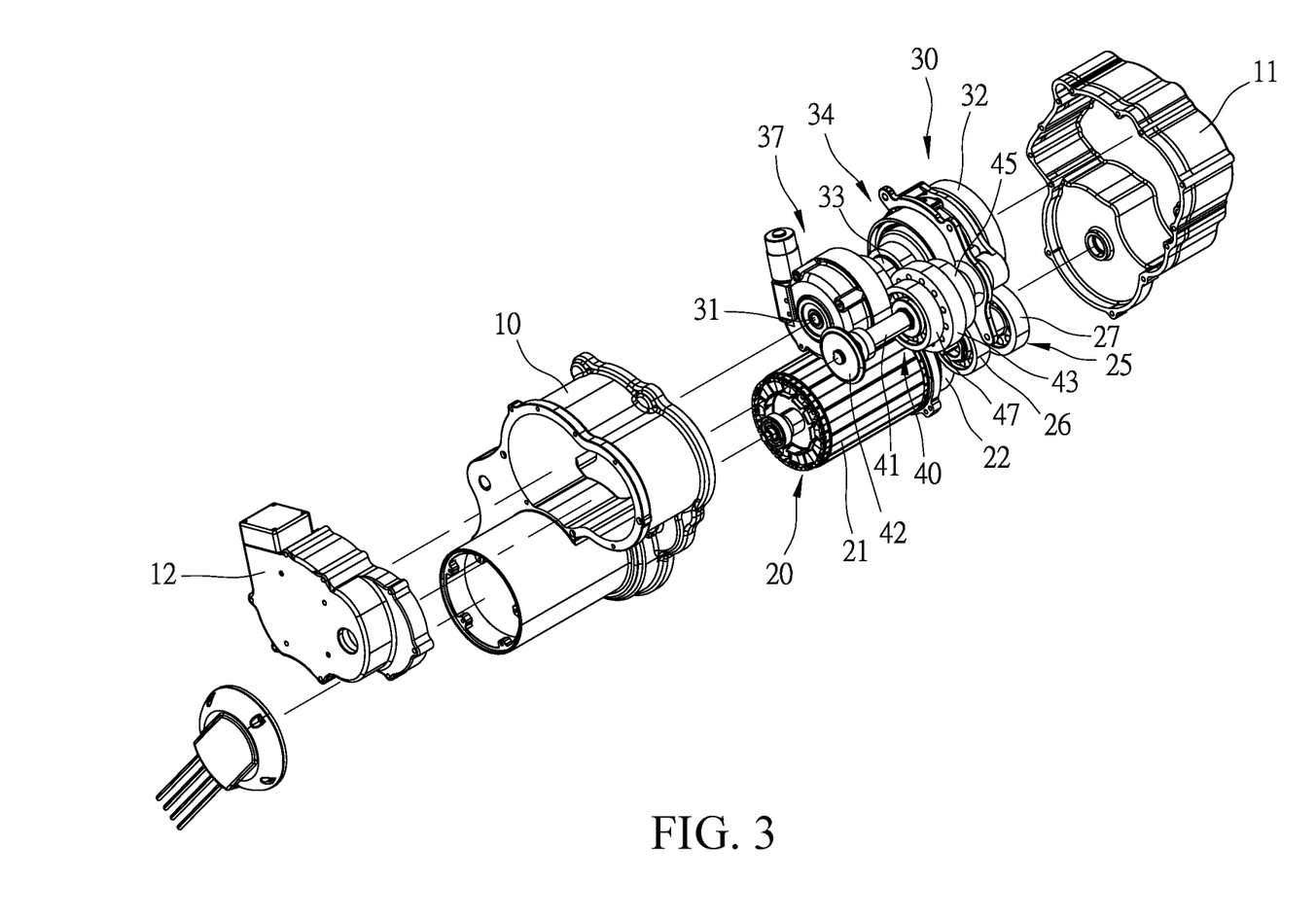
FIG. 3 is a rough exploded view of the present invention taken from a different perspective.

A structure of the present invention is shown in FIGS. 1, 2, and 3, and comprises a drive assembly 20, an input assembly 30 and an output assembly 40 arranged in an interior of a casing 10.

A detailed structure of a preferred embodiment is illustrated in FIGS. 3, 4, 5, 6, and 7. The casing 10 is provided with a first end cover 11 and a second end cover 12 respectively mounted to two ends thereof to protect and support the drive assembly 20, the input assembly 30 and the output assembly 40 of which axes are arranged in parallel.

The drive assembly 20 comprises an electrical motor 21. The electrical motor 21 has an output shaft that comprises a drive wheel 22 that drives the input assembly 30. The drive wheel 22 is set in mating and transmitting engagement with the input assembly 30 by means of a gear ratio adjusting assembly 25. Further, the gear ratio adjusting assembly 25 comprises a first gear 26 and a second gear 27 that are coaxial and are rotatable in synchronization with each other, wherein the first gear 26 is in mating engagement with the drive wheel 22 of the electrical motor 21.

Figure 4:
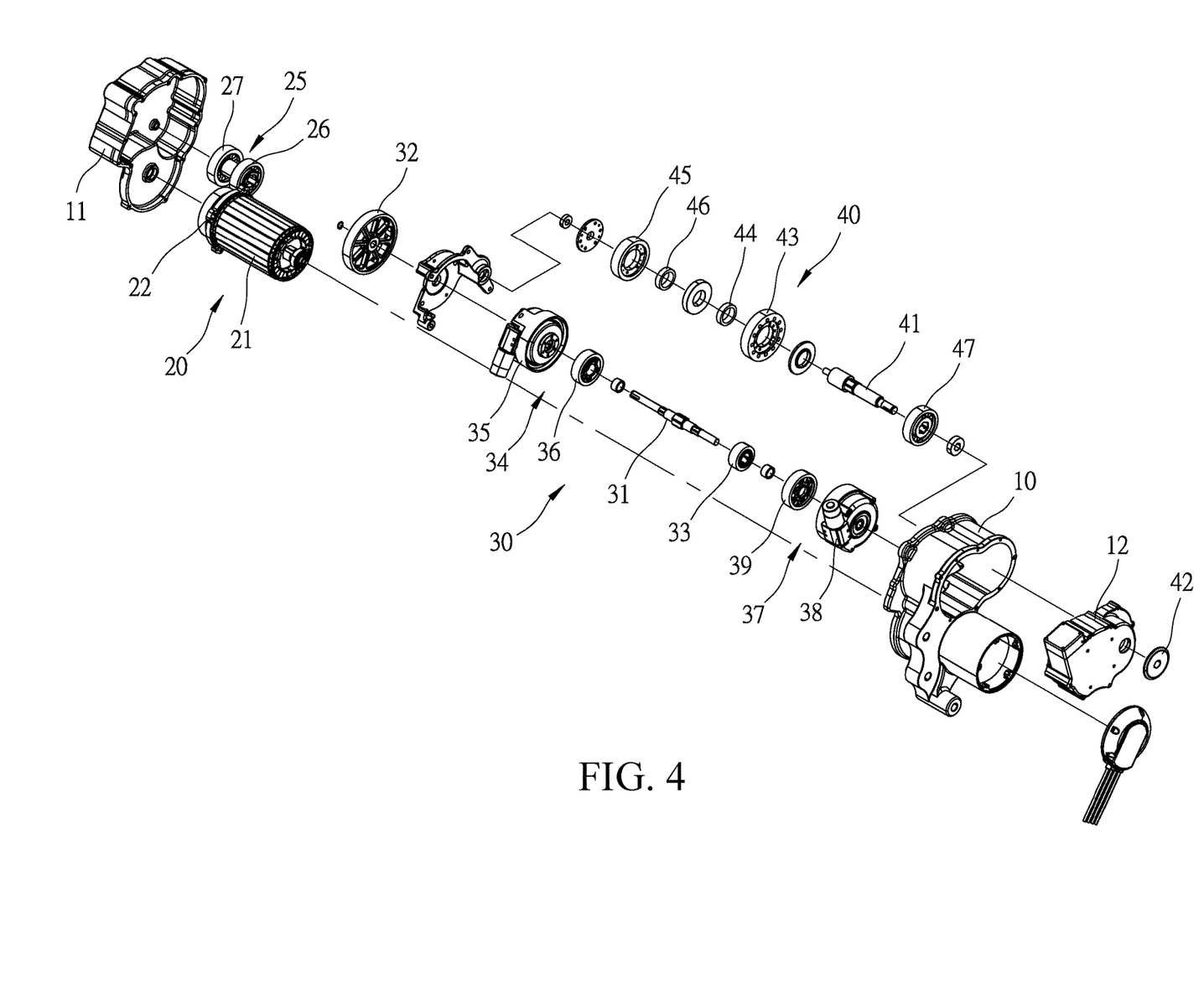
FIG. 4 is a detailed exploded view of the present invention.
Figure 5:
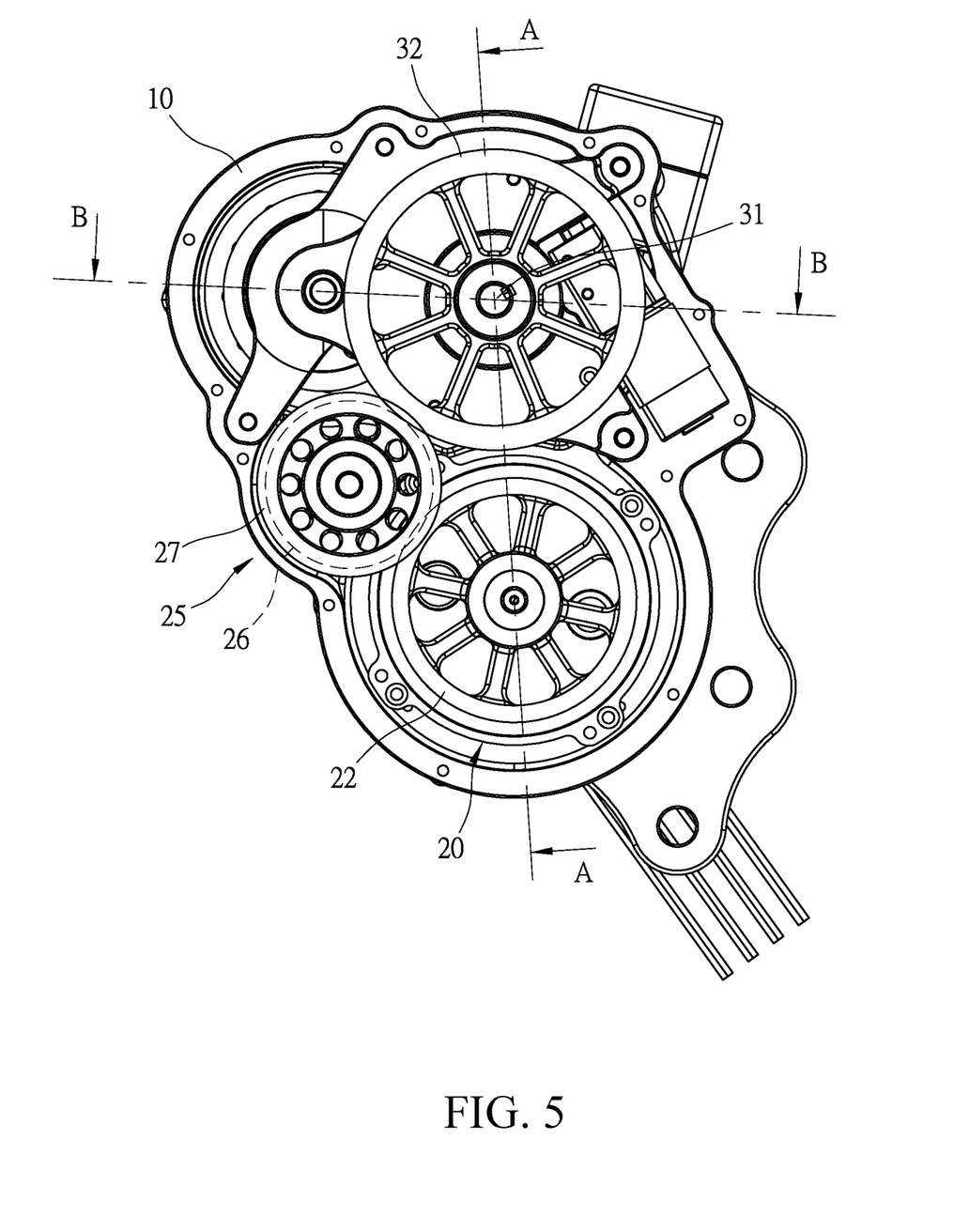
FIG. 5 is an end view of an interior of the present invention in an assembled condition.
Figure 6:
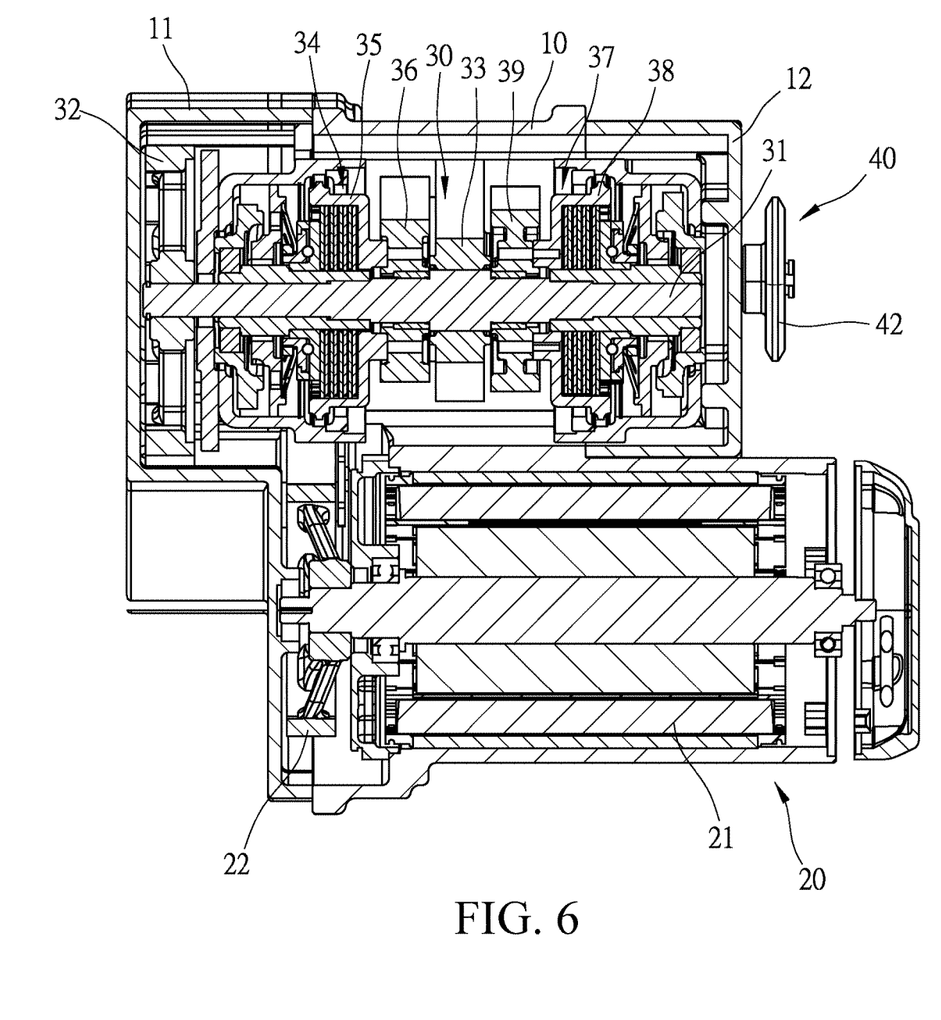
FIG. 6 is a cross-sectional view of the present invention, taken along line A-A of FIG. 5.

The input assembly 30 comprises a transmission shaft 31 that is parallel with an axis of the drive wheel 22 of the drive assembly 20, as shown in FIGS. 4 and 6. An end of the transmission shaft 31 is provided with a driven wheel 32 fixedly mounted thereto to be driven by the drive wheel 22. The driven wheel 32 is in mating engagement with the second gear 27 of the gear ratio adjusting assembly 25, so that a rotational speed of the input assembly 30 driven by the drive assembly 20 is variable by varying a gear ratio of the first and second gears 26, 27. Further, the transmission shaft 31 of the input assembly 30 is provided with an initial transmission wheel 33 mounted to a middle section thereof to drive the output assembly 40, and a first speed-change assembly 34 and a second speed-change assembly 37 are respectively arranged at two opposite sides of the initial transmission wheel 33, wherein the first speed-change assembly 34 comprises a first clutch 35 mounted on the transmission shaft 31, and the first clutch 35 comprises a first transmission wheel 36 that is mounted on the transmission shaft 31 and is selectively drivable; and the second speed-change assembly 37 arranged on the other side comprises a second clutch 38 mounted on the transmission shaft 31, and the second clutch 38 comprises a second transmission wheel 39 that is mounted on the transmission shaft 31 and is selectively drivable.

Figure 7:
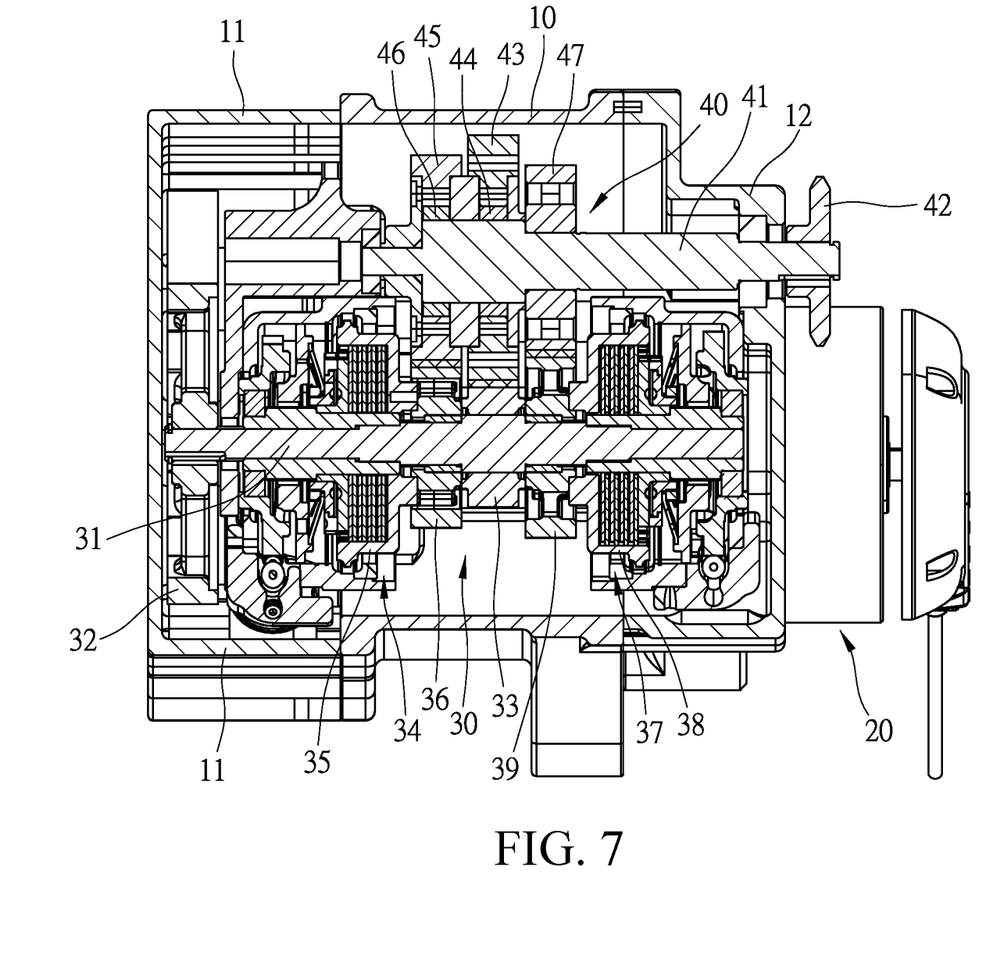
FIG. 7 is a cross-sectional view of the present invention, taken along line B-B of FIG. 5.

The output assembly 40 comprises an output shaft 41 that is arranged parallel with an axis of the transmission shaft 31 of the input assembly 30, as shown in FIGS. 4 and 7. At least one of two ends of the output shaft 41 is extended out of an end of the casing 10 and is provided with an output wheel 42, which drives an external driven member, such as a chain (not shown in the drawings). The output shaft 41 is provided with an initial driven wheel 43 mounted to a middle section thereof and in mating engagement with the initial transmission wheel 33 of the input assembly 30, and a first speed-change wheel 45 and a second speed-change wheel 47 are respectively arranged on two opposite sides of the initial driven wheel 43, wherein the first speed-change wheel 45 is in mating engagement with the first transmission wheel 36 of the transmission shaft 31, and the second speed-change wheel 47 is in mating engagement with the second transmission wheel 39 of the transmission shaft 31. The initial driven wheel 43 and the first speed-change wheel 45 are arranged on the output shaft 41 by means of a first one-way bearing 44 and a second one-way bearing 46, respectively, wherein the first one-way bearing 44 and the second one-way bearing 46 are both one-way elements that are lockable for driving in a same direction. Further, a rotational speed generated by means of a gear ratio between the first transmission wheel 36 of the first speed-change assembly 34 and the first speed-change wheel 45 of the output shaft 41 is higher than a rotational speed generated by means of a gear ratio between the initial transmission wheel 33 and the initial driven wheel 43, and a rotational speed generated by means of a gear ratio between the second transmission wheel 39 of the second speed-change assembly 37 and the second speed-change wheel 47 of the output shaft 41 is higher than the rotational speed generated by means of the gear ratio between the initial transmission wheel 33 and the initial driven wheel 43, so that when the input assembly 30 drives the output shaft 41 through the first speed-change assembly 34, the initial driven wheel 43 is in idling rotation to allow transfer of power to be stable and smooth without causing any feeing of setting back. According to some embodiments, the rotational speed generated by the gear ratio between the second transmission wheel 39 of the second speed-change assembly 37 and the second speed-change wheel 47 of the output shaft 41 is higher than the rotational speed generated by the gear ratio between the first transmission wheel 36 of the first speed-change assembly 34 and the first speed-change wheel 45, so that when the input assembly 30 drives the output shaft 41 through the second speed-change assembly 37, the first speed-change wheel 45 and the initial driven wheel 43 are both in idling rotation to allow transfer of power to be stable and smooth without causing any feeing of setting back.

As such, the first speed-change assembly 34 and the second speed-change assembly 37 arranged between the input assembly 30 and the output assembly 40 are individually operable to cause an increase or step-up on the initial rotational speed outputted from the drive assembly 20, so as to achieve an effect of three-stage speed change. Further, since the first and second end covers 11, 12 on the two sides of the casing 10 are set to respectively correspond to the first speed-change assembly 34 and the second speed-change assembly 37 of the input assembly 30, so that assembling/disassembling and servicing of the first speed-change assembly 34 and the second speed-change assembly 37 can be enhanced, and as such, a three-stage speed-change mechanism having a simple structure and easy to maintain is realized.

Figure 8:
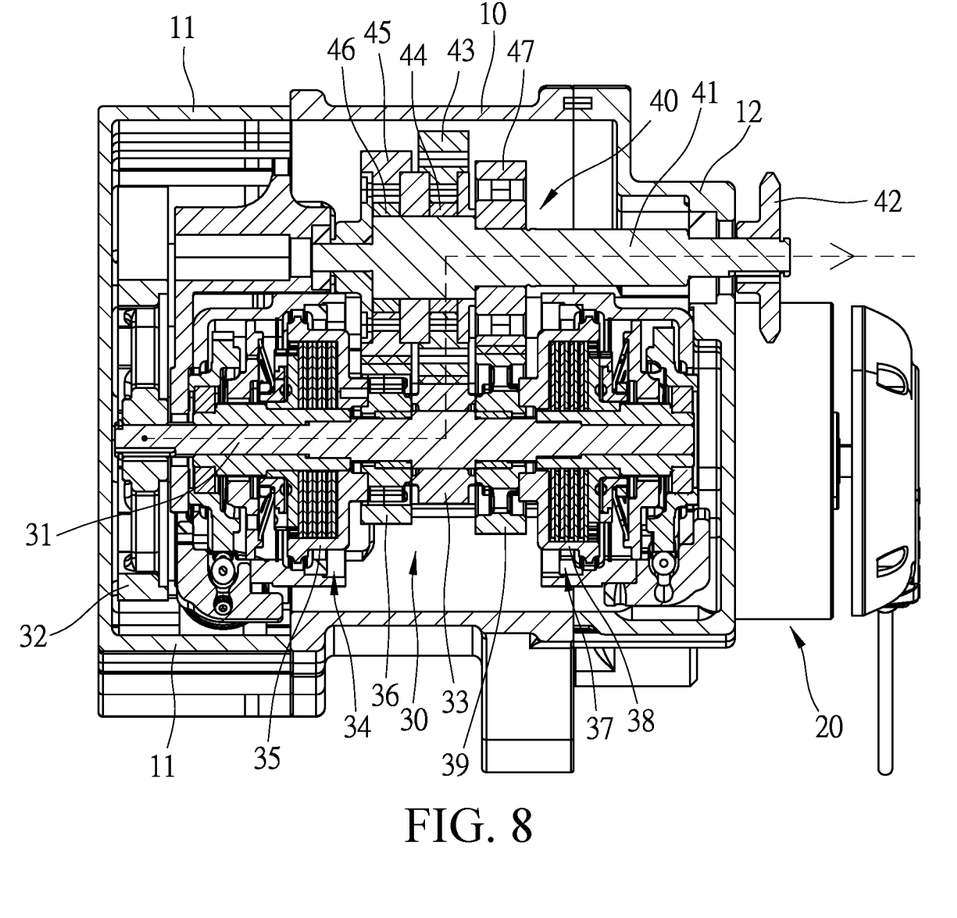
FIG. 8 is a top view, in a sectioned form, of the present invention in a home position.

To practically operate the present invention, at the beginning when the initial rotational speed is adopted, as shown in FIGS. 2, 4, and 8, the drive wheel 22 of the electrical motor 21 of the drive assembly 20 drives, by means of the gear ratio adjusting assembly 25, the transmission shaft 31 of the input assembly 30 to rotate with the initial rotational speed, and the first and second clutches 35, 38 of the first and second speed-change assemblies 34, 37 arranged on the transmission shaft 31 are not activated to get engaged, so that the first and second transmission wheels 36, 39 of the first and second speed-change assemblies 34, 37 are not driven by the transmission shaft 31, and consequently, only the initial transmission wheel 33 on the transmission shaft 31 is being driven to thereby drive the initial driven wheel 43 on the output shaft 41 of the output assembly 40 in mating engagement therewith, and the initial driven wheel 43 drives the output shaft 41 through the first one-way bearing 44 to have the output shaft 41 driven by the electrical motor 21 to drive the output wheel 42 to rotate with the initial rotational speed.

Figure 9:
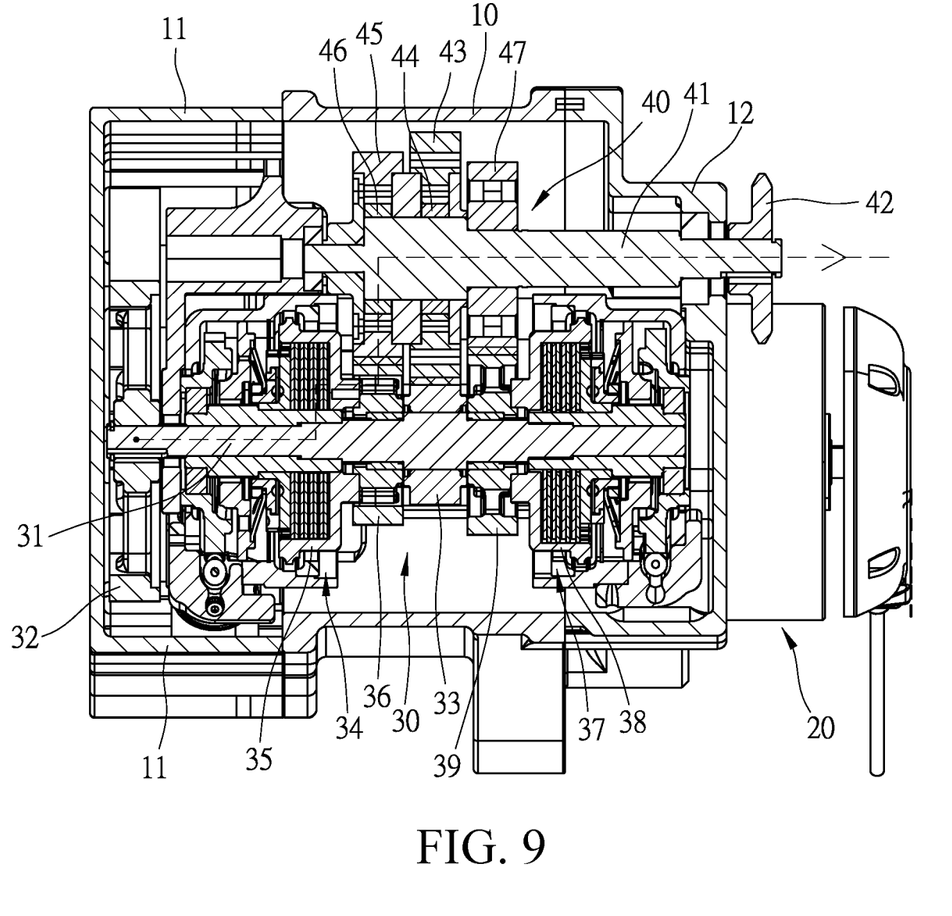
FIG. 9 is a top view, in a sectioned form, of the present invention in a first speed-up position.

To go into the first step-up position during the output shaft 41 of the output assembly 40 being in rotation with the initial rotational speed, as shown in FIG. 9, when the drive wheel 22 of the electrical motor 21 of the drive assembly 20 drives, by means of the gear ratio adjusting assembly 25, the transmission shaft 31 of the input assembly 30 to rotate with the initial rotational speed, the first clutch 35 of the first speed-change assembly 34 arranged on the transmission shaft 31 is activated to get engaged, while the second clutch 38 of the second speed-change assembly 37 arranged on the transmission shaft 31 is still not activated to get engaged, so that the first transmission wheel 36 of the first speed-change assembly 34 is driven by the transmission shaft 31, and since the gear ratio between the first transmission wheel 36 of the first speed-change assembly 34 and the first speed-change wheel 45 is greater than that between the initial transmission wheel 33 and the initial driven wheel 43, the rotational speed of the first speed-change wheel 45 is higher than that of the initial driven wheel 43, and thus, the first speed-change wheel 45 drives the output shaft 41 through the second one-way bearing 46, and reversed idling rotation is induced between the output shaft 41 and the first one-way bearing 44 of the initial driven wheel 43 so as to make the initial driven wheel 43 not interfering with the output shaft 41, and the output shaft 41 is driven by the electrical motor 21 via the first speed-change assembly 34 to drive the output wheel 42 to operate with the rotational speed of the first step-up position. Further, since the rotational speed of the output shaft 41 is changed from the initial rotational speed toward the first step-up rotational speed, a difference of rotational speed is relatively small, so that the transfer of power is made smooth and stable and no feeling of setting back may develop.

Figure 10:
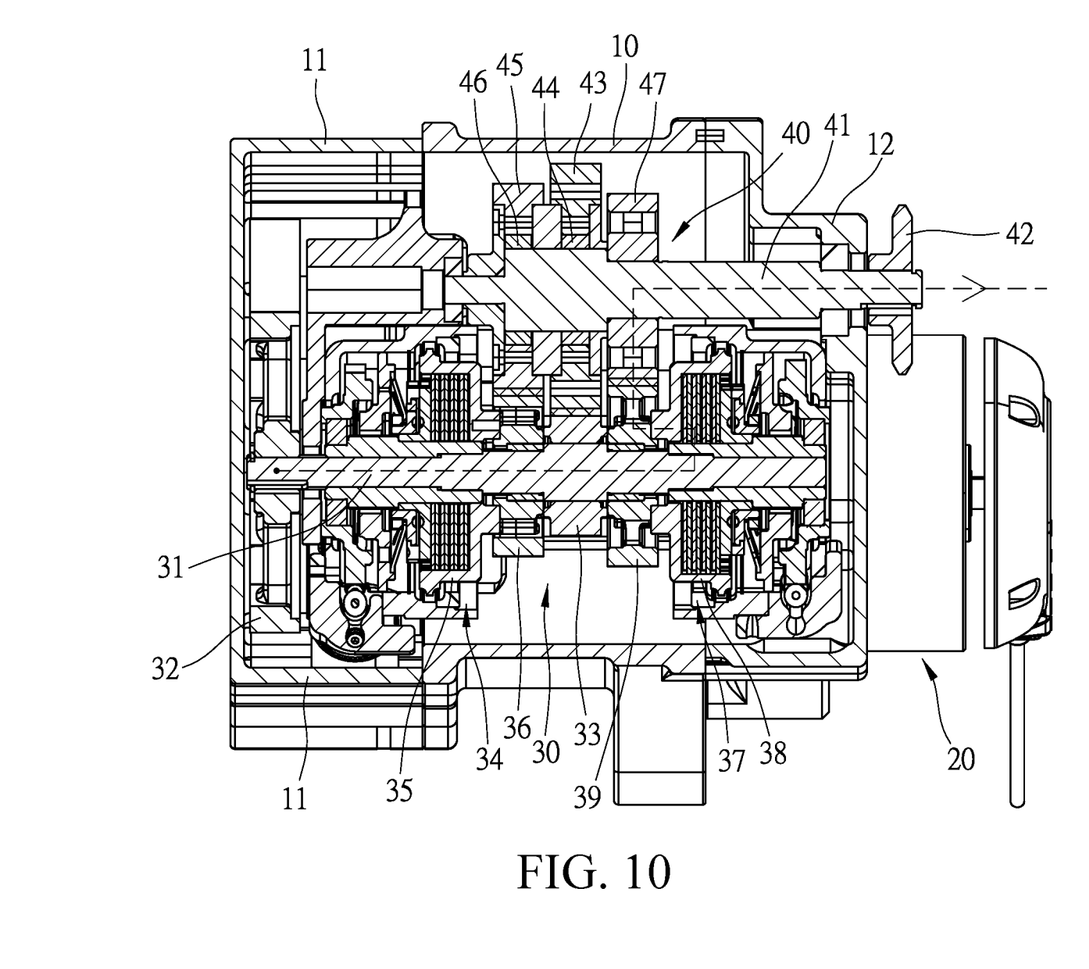
FIG. 10 is a top view, in a sectioned form, of the present invention in a second speed-up position.

To go into the second step-up position during the output shaft 41 of the output assembly 40 being in rotation with the first step-up speed, as shown in FIG. 10, when the drive wheel 22 of the electrical motor 21 of the drive assembly 20 drives, by means of the gear ratio adjusting assembly 25, the transmission shaft 31 of the input assembly 30, and the first speed-change assembly 34 drives the output shaft 41 to rotate with the first step-up rotational speed, the second clutch 38 of the second speed-change assembly 37 arranged on the transmission shaft 31 is activated to get engaged, so that the second transmission wheel 39 of the second speed-change assembly 37 is driven by the transmission shaft 31, and since the gear ratio between the second transmission wheel 39 of the second speed-change assembly 37 and the second speed-change wheel 47 is greater than the gear ratio between the first transmission wheel 36 of the first speed-change assembly 34 and the first speed-change wheel 45 and that between the initial transmission wheel 33 and the initial driven wheel 43, the rotational speed of the second speed-change wheel 47 is higher than those of the first speed-change wheel 45 and the initial driven wheel 43, and thus, the second speed-change wheel 47 drives the output shaft 41, and reversed idling rotation is induced between the output shaft 41 and the second one-way bearing 46 of the first speed-change wheel 45 and also the first one-way bearing 44 of the initial driven wheel 43 so as to make the first speed-change wheel 45 and the initial driven wheel 43 not interfering with the output shaft 41, and the output shaft 41 is driven by the electrical motor 21 via the second speed-change assembly 37 to drive the output wheel 42 to operate with the rotational speed of the second step-up position. Further, since the rotational speed of the output shaft 41 is changed from the first step-up rotational speed toward the second step-up rotational speed, a difference of rotational speed is relatively small, so that the transfer of power is made smooth and stable and no feeling of setting back may develop.

Based on the design and illustration discussed above, the present invention provides that the initial transmission wheel 33 is arranged on a middle section of the transmission shaft 31 of the input assembly 30, and the first speed-change assembly 34 and the second speed-change assembly 37 are arranged on the transmission shaft 31 respectively at two opposite sides of the initial transmission wheel 33, and that the first one-way bearing 44 provided on the initial driven wheel 43 and the second one-way bearing 46 provided on the first speed-change wheel 45 are both one-way elements that are lockable for driving in a same direction, in combination with the arrangement of the first and second end covers 11, 12 on the two sides of the casing 10, so that in addition to a three-stage speed-change function achievable with the present invention, the step-by-step speed increase makes the transfer of power smooth and stable, without developing any feeling of setting back. Further, the first and second speed-change assemblies 34, 37 are respectively arranged at two sides of the transmission shaft 31, so that the structure is made simple and assembling/disassembling and servicing can be conducted by opening the first and second end covers 11, 12 on the two sides of the casing 10, so that there is no need to disassembling the entire device, and thus easiness of mounting and servicing can be greatly improved.

I claim:

1. A three-stage speed-change mechanism, comprising:
a drive assembly, which comprises an electrical motor, the electrical motor having an output shaft that comprises a drive wheel that drives an input assembly;
the input assembly, which comprises a transmission shaft driven by the drive wheel, an initial transmission wheel being mounted on a middle section of the transmission shaft, a first speed-change assembly and a second speed-change assembly being respectively arranged at two opposite sides of the initial transmission wheel, wherein the first speed-change assembly comprises a first clutch arranged on the transmission shaft, the first clutch being provided with a first transmission wheel that is arranged on the transmission shaft and is selectively drivable; and the second speed-change assembly arranged on the opposite side comprises a second clutch arranged on the transmission shaft, the second clutch being provided with a second transmission wheel that is arranged on the transmission shaft and is selectively drivable; and
an output assembly, which comprises an output shaft that is arranged parallel with an axis of the transmission shaft of the input assembly, the output shaft being provided, on a middle section thereof, with an initial driven wheel in mating engagement with the initial transmission wheel, a first speed-change wheel and a second speed-change wheel being respectively arranged on two opposite sides of the initial driven wheel, wherein the first speed-change wheel is in mating engagement with the first transmission wheel, and the second speed-change wheel is in mating engagement with the second transmission wheel, and the initial driven wheel is mounted by means of a first one-way bearing on the output shaft, and the first speed-change wheel is mounted by means of a second one-way bearing on the output shaft, wherein the first one-way bearing and the second one-way bearing are one-way elements that are lockable for driving in a same direction, and a rotational speed generated by means of a gear ratio between the first transmission wheel of the first speed-change assembly and the first speed-change wheel is higher than a rotational speed generated by means of a gear ratio between the initial transmission wheel and the initial driven wheel, and a rotational speed generated by means of a gear ratio between the second transmission wheel of the second speed-change assembly and the second speed-change wheel is higher than the rotational speed generated by means of the gear ratio between the initial transmission wheel and the initial driven wheel;
wherein in the input assembly, the initial transmission wheel is directly mounted to the transmission shaft of the input assembly, and in the output assembly, the second speed-change wheel is directly mounted to the output shaft; and
wherein the drive assembly, the input assembly, and the output assembly are arranged in an interior of a casing, and a first end cover and a second end cover that are selectively removable are respectively mounted to two ends of the casing to respectively correspond to the first speed-change assembly and the second speed-change assembly;
wherein an end of the transmission shaft of the input assembly is provided with a driven wheel fixedly mounted thereto to be driven by the drive wheel; and
wherein the drive wheel of the drive assembly is set in mating and transmitting engagement with the driven wheel of the input assembly by means of a gear ratio adjusting assembly, and the gear ratio adjusting assembly comprises a first gear and a second gear that are coaxial and are rotatable in synchronization with each other, wherein the first gear is in mating engagement with the drive wheel, and the second gear is in mating engagement with the driven wheel, so that an initial rotational speed that the drive assembly drives the input assembly is variable by varying a gear ratio of the first and second gears.

2. The three-stage speed-change mechanism according to claim 1, wherein at least one of two ends of the output shaft of the output assembly is provided with an output wheel, which is adapted to drive an external driven element.

3. The three-stage speed-change mechanism according to claim 1, wherein the rotational speed generated by means of the gear ratio between the second transmission wheel of the second speed-change assembly and the second speed-change wheel of the output assembly is higher than the rotational speed generated by means of the gear ratio between the first transmission wheel of the first speed-change assembly and the first speed-change wheel of the output assembly.

* * * * *